United States Patent [19]
Yamano et al.

[11] 3,816,257
[45] June 11, 1974

[54] METHOD FOR PRODUCING CEPHALOSPORIN C

[75] Inventors: Togo Yamano, Nara; Toshihiko Kanzaki; Haruo Suide; Keisuke Tsubaki, all of Osaka, Japan

[73] Assignee: Takeda Chemical Industries, Ltd., Osaka, Japan

[22] Filed: Nov. 15, 1972

[21] Appl. No.: 306,863

[30] Foreign Application Priority Data
Nov. 15, 1971    Japan.............................. 46-91390

[52] U.S. Cl.............................. 195/36 R, 195/36 P
[51] Int. Cl............................................. C12d 9/04
[58] Field of Search .................................. 195/36 R

[56] References Cited
UNITED STATES PATENTS

| | | | |
|---|---|---|---|
| 3,082,155 | 3/1963 | Kevin et al........................ | 195/36 R |
| 3,396,083 | 8/1968 | Callow............................. | 195/36 R |

*Primary Examiner*—Alvin E. Tanenholtz
*Attorney, Agent, or Firm*—Wenderoth, Lind & Ponack

[57]    ABSTRACT

A method for producing cephalosporin C, which comprises culturing a microorganism belonging to a hitherto undiscovered species of the genus *Cephalosporium* so that cephalosporin C may be accumulated in the culture medium, then recovering so accumulated cephalosporin C from the culture broth. Thus, a new species was established by the present inventors and named as *Cephalosporium polyaleurum*.

5 Claims, No Drawings

METHOD FOR PRODUCING CEPHALOSPORIN C

This invention relates to a method for the production of cephalosporin C by cultivation of new microorganisms designated as *Cephalosporium polyaleurum.* Cephalosporin C is an important compound which is useful as a starting compound for the synthesis of other cephalosporin-type antibiotics.

Cephalosporin C has been obtained by cultivation of cephalosporin C-producing microorganisms. Though microorganisms belonging to a few species, i.e. *Cephalosporium acremonium*, *Emericellopsis glabra* and *Emericellopsis microspora*, are known to produce cephalosporin C, no microorganisms other than *Cephalosporium acremonium CMI* 49137 and its mutant 8650(ATCC-14553) had been employed for the industrial production of cephalosporin C because of their low productivity of cephalosporin C. Moreover, all the hitherto known cephalosporin C-producing microorganisms produce penicillin N concomitantly in an amount several times that of cephalosporin C.

The separation of cephalosporin C from the mixture of cephalosporin C and pennicillin N has been performed by acid treatment of the mixture taking advantage of the difference in their stability against acids. While cephalosporin C is more stable than penicillin N against acids, it is also decomposed more or less by acids. Therefore, it is desirable to make the proportion of pennicillin N in the culture broth as low as possible.

It has now been discovered that a new microorganism, which was isolated from the soil of Wakayama, Japan and designated as *Cephalosporium polyaleurum*, produces a by far larger amount of cephalosporin C than penicllin N, namely in an amount generally 10 times or more than that of penicillin N.

The present invention thus relates to a method for producing cephalosporin C by culturing a microorganism belonging to *Cephalosporium polyaleurum*, in a culture medium, accumulating cephalosporin C in the medium and recovering the accumulated cephalosporin C from the culture broth.

According to the method of this invention, the content of penicillin N produced concomitantly with cephalosporin C is so small as to be less than one-tenth of the latter, which makes it possible to omit the acid-treatment step in the purification of cephalosporin C. This small amount of penicillin N is completely eliminated in the subsequent purification steps, especially in the crystallization of cephalosporin C. Moreover, the microorganisms employed in the method of this invention are capable of accumulating a by far larger amount of cephalosporin C than the known microorganisms. While helvolic acid is also produced concomitantly in the present method, it can be easily separated from cephalosporin C by, for example, extraction with a water-immiscible solvent such as ethyl acetate or butyl acetate.

Thus, the method of the present invention is greatly advantageous for the industrial production of cephalosporin C.

The microorganisms employed in the present invention, *Cephalosporium polyaleurum* 199 and *Cephalosporium polyaleurum* Y-505, have been deposited at the Fermentation Research Institute Agency of Industrial Science and Technology, Chiba, Japan under the deposition numbers, FERM-P No. 1159 and FERM-P No. 1160, respectively, and at the American Type Culture Collection, Maryland, USA under the deposition numbers, ATCC-20359 and ATCC-20360, respectively.

In order to make it clear that the strain *Cephalosporium Polyaleurum* 199 belongs to a new species, its microbiological and cultural characteristics are shown below.

The characteristics described below are those observed upon cultivation at 27° C for 168 hours. 1. Cultural characteristics on agar 1. Malt extract-agar medium Growth: rapid, spreading, arachnoid, with sparse aerial mycelium, at first white than becoming pale cream colored.

Aerial hyphae: $1.0-1.5\mu$ wide

Reverse: hyaline

2. Potato agar medium

Growth: rapid, spreading, with white to pale brown aerial mycelium in abundance.

Reverse: hyaline to pale yellow

3. Czapek's agar

Growth: rapid, spreading, with pure white aerial mycelium in abundance.

Reverse: hyaline

4. Oatmeal agar

Growth: rapid, spreading

Reverse: hyaline to pale yellow 5. 1% Glucose bouillion agar

Growth: rapid, spreading

Aerial phyphae: in abundance

Reverse: pale yellow 2. Morphological characteristics

1. Conidiophores scarcely develop in the beginning of growth, arise or erect as side branches on aerial hyphae, $40-60\mu$ long, $1.0-1.5\mu$ wide, $2\mu$ wide at base, mostly unbranched, produce a mucilaginous conidial ball.

2. Conidia are phialosporous, elliptical, straight, $1.5-2.0 \times 3-6\mu$, hyaline, single-celled.

3. Aleuriospores developed in abundance terminally or pleurogenously on hyphae, pyriform, straight or slightly curved, thick-walled, having a separating frill at base, usually single, $3-4 \times 4-6\mu$, hyaline.

4. No sexual reproduction organ is formed. 3. The optimum temperature for growth is 25°–30° C, and the optimum pH is 5.0–7.0.

Consulting with the classification by "Ainsworth and Bisby's Dictionary of Fungi, sixth edition," it is evident that the present microorganism belongs to Fungi Imperfecti-Order Moniliales-Family Moniliaceae-Genus *Cephalosporium* in the joint formation of a mucilaginous conidial ball at the top of conidiophore.

In view of the fact that the present microorganism is characterized by having a capacity to form characteristic aleuriospores in abundance of very reduced conidial formation, it is clear the present microorganism does not belong to any species of the genus *Cephalosporium* known by Rabenhorst's "*Kryptogamenflora der Markbrandenburg VIII* (1907)," Sakapure and Thirumalachar's "Mycologia" 55 (1963) and 58(1966), and Durrell's "Colorado State Univ." No.248 (1963).

In comparison with similar species, the present microorganism resembles *Cephalosporium acremonium* in color of growth and the size of conidia, but the former is easily differentiated from the latter from the viewpoint that the former has few conidia and forms many aleuriospores and that the conidiophore of the former is shorter than that of the latter.

The present microorganism is similar to *Cephalosporium asteroides* Grutzii Ben in respect to the formation of few conidia and the short conidiophore, but it is different from the latter in the formation of aleuriospore.

Formation of the aleuriospores in abundance is one of the striking characteristics of the present microorganism.

Consequently, it has been decided that the present strain 199 belongs to a new species of genus *Cephalosporium*, and the species has now been designated as *Cephalosporium polyaleurum*.

The known cephalosporin-producing strains produce penicillin N and cephalasporins C and P simultaneously, but the present microorganism does not produce cephalosporin P at all, but produces helvolic acid. The above fact is also a striking characteristic of the present microorganism.

According to the present invention, the microorganisms which belong to the new species, Cephalosporium polyaleurum, are used. In addition to the above strain 199, mutants, which are obtained by, for example, irradiating strain 199 with ultraviolet rays or single cell separation of the above strain, can be used for the present invention.

As the culture medium to be employed in this invention, any medium employed in the cultivation of the known microorganisms belonging to genus *Cephalosporium* can be employed. Suitable carbon sources are exemplified by saccharides(e.g. glucose, sucrose, starch, soluble-starch, blackstrap molasses,)n-paraffin, acetic acid, ethanol, glycerol and sorbitol. Suitable nitrogen sources are exemplified by inorganic nitrogen compounds such as ammonium chloride, ammonium sulfate, ammonium nitrate and various kinds of ammonium salts and nitrates, and organic nitrogen sources such as urea, meat-extract, peptone, soybean flour, cotton-seed meal, corn steep liquor, yeast extract, dry yeast and casein. Metal salts such as the chlorides, carbonates, and phosphates of potassium, magnesium and calcium can be added to the culture medium, if necessary. Addition of materials such as methionine, crystine, cysteine, methyl oleate and lard oil to the medium usually increases the yield of cephalosporin C.

The cultivation is advantageously conducted by submerged culture under aeration, at a temperature ranging from 15° to 37° C, more preferably 20° to 32° C, and at pH of 3–10, more preferably at a pH of 5–8 for 10–360 hours and most preferably between 48 and 240 hours.

In the thus fermented culture broth, a far larger amount of cephalosporin C and helvolic acid and a small amount of penicillin N are accumulated. These substances are scarcely accumulated intracellularly, but mainly accumulated extracellularly.

The separation of cephalosporin C from the culture broth is conveniently carried out at first by filtration of the culture broth, and washing the cells with water and then separating cephalosporin C from the mixture of the filtrate and the washing. In order to separate the thus accumulated cephalosporin C from the mixture, any per se known means for separation of cephalosporin C may be employed. For example, the pH of the mixture is adjusted to about 5 and treated with a water-immiscible organic solvent such as ethyl acetate or butyl acetate to extract helvolic acid. Cephalosporin C and penicillin N exists in the aqueous part. The aqueous part is passed over a column of activated carbon and is eluted with aqueous acetone. The thus obtained acetone-water solution, after being concentrated or not, is passed over a column of a weakly basic ion-exchange resin and is eluted with an appropriate solution such as an ammonium acetate buffer solution. The said procedures may be repeated. Finally, the sodium salt of cephalosporin C can be separated as crystals. Penicillin N is not detected in the purified product. All the physico-chemical properties of the purified crystals are identical to those of the cephalosporin C reported in known literature references.

The helvolic acid can also be isolated, if desired, by a per se conventional purification process. The combined solution of both the culture filtrate and the washing is adjusted to pH of 5.0 with an acid such as hydrochloric acid, followed by treating with a water-immiscible solvent (e.g. butylacetate). Helvolic acid is transferred to the solvent layer. After concentrated to a syrup, it is subjected to column chromatography on silica gel.

Crude crystals of helvolic acid are obtained by concentrating the helvolic acid-containing eluate. The crude crystals are purified by recrystallization, whereby helvolic acid is obtained as white needles.

For further explanation of the present invention, the following examples are given, wherein "part(s)" is based on weight unless otherwise noted and the relationship between "part(s)" and "part(s) by volume" corresponds to that between "gram(s)" and "milliliter(s)." And $\mu g$, rpm, M and % mean microgram(s), revolution(s) per minute, molar concentration and percent, respectively. Percentages are on weight per volume basis unless otherwise stated.

EXAMPLE 1

One hundred parts by volume of seed-culture medium (pH 7.0) containing 3.0% of sucrose, 1.5% of meat-extract, 0.5% of corn steep liquor and 0.15% of $CaCO_3$ are poured into a fermentor of 400 parts by volume in capacity. After sterilization, the medium is inoculated with a culture of *Cephalosporium polyaleurum* 199 (FERM-P No. 1159, ATCC-20359), and is then cultured at 28° C for 48 hours on a rotary shaker at 200 r.p.m. to give an inoculum.

Three thousand parts by volume of fermentation medium (pH 7.0) containing 3.0% of sucrose, 3.0% of raw soybean flour, 0.5% of DL-methionine and 0.15% of $CaCO_3$ is poured into a fermentor of 20,000 parts by volume in capacity and is then sterilized.

To the fermentation medium is added 100 parts by volume of the inoculum. After incubation at 24° C for 144 hours, the fermented liquor shows potencies of 165$\mu$g/ml. of cephalosporin C, 150$\mu$g/ml. of helvolic acid and not more than 10$\mu$g/ml. of penicillin N.

The culture broth is then filtered to remove mycelia, and 2,500 parts by volume of the filtrate are adjusted to a pH of 5.0 with hydrochloric acid. This solution is extracted twice with 1/2 volume of ethyl acetate, and the water layer is passed over a column of activated carbon to adsorb cephalosporin C, followed by elution of cephalosporin C with 50% (volume per volume) acetone-water. The eluate is charged on an Amberlite IRA-900(acetate-form) (Rohm and Haas Company)

column and the adsorbed cephalosporin C is eluted with 0.2 M ammonium acetate buffer solution (pH 5.0).

The cephalosporin C portions showing antibacterial activities are collected and concentrated under reduced pressure. The concentrate is charged on a column of activated carbon to adsorb cephalosporin C. The antibiotic is eluted with 50% (volume per volume) acetone-water and the eluate is concentrated under reduced pressure. To the concentrate is added an excess amount of acetone, whereby crude powder of cephalosporin C is obtained. The thus obtained crude powder is dissolved in water and the solution is passed over a column of Dowex 1×2 (acetate-form) (Dow Chemical Company). The cephalosporin C adsorbed on the resin is eluted with the ammonium, acetate buffer mentioned above. The eluate is passed over a column of activated carbon and the adsorbed cephalosporin C is eluted with 50% (volume per volume) acetone-water. The cephalosporin C portion is combined together and concentrated and neutralized with a solution of sodium hydroxide. Ethanol is added to the solution to make a 70% (volume per volume) ethanol solution, whereby crystals of sodium salt of cephalosporin C is precipitated. The crystals are recovered by filtration and dried, whereby 0.124 parts by weight of crystals are obtained. The physical properties, including the melting point of the product, are identical those of an authentic sample of cephalosporin C.

The fractions of ethyl acetate solution obtained by the above-mentioned process are combined and washed with water, and then concentrated under reduced pressure.

The concentrated solution is passed over a column of silica gel, and the absorbed helvolic acid is eluted with chloroform.

From the portion which has a potency enough to prevent the growth of *Staphylococcus aureus* 209 P, 0.3 parts by weight of crude crystals of helvolic acid is obtained.

EXAMPLE 2

Five hundred parts by volume of a seed-culture medium (pH 7.0) containing the same components as in Example 1 are poured into a fermentor of 2,000 parts by volume in capacity, and is sterilized. The medium is inoculated with a culture of *Cephalosporium polyaleurum* Y-505(FERM-P No.1160, ATCC-20360) which was obtained by ultraviolet rays treatment and the single cell separation of *Cephalosporium polyaleurum* 199.

The inoculated medium is incubated at 28° C for 48 hours on a rotary shaker at 200 r.p.m.

Thirty thousand parts by volume of fermentation medium (pH 7.0) containing 3.0% of raw soybean flour, 3.0% of sucrose, 0.5% of DL-methionine and 0.15% of $CaCO_3$ are poured into a fermentor of 50,000 parts by volume in capacity, followed by sterilization.

To the fermentation medium is added 1,000 parts by volume of the above-prepared seed-culture. The inoculated medium is incubated at 26° C under stirring and aeration (aeration rate; 30,000 parts by volume of air per minute, stirring; 200 r.p.m.) for 96 hours.

The culture broth is then filtered to remove mycelia, whereby 25,000 parts by volume of filtrate having potencies of 2,400 μg/ml. of cephalosporin C, 1,800 μg/ml. of helvolic acid and 40μg/ml. of penicillin N are obtained.

The thus obtained filtrate is treated in the same manner as those of Example 1, whereby 21.0 parts by weight of cephalosporin C and 51.0 parts by weight of crude helvolic acid are obtained. The physical properties of cephalosporin C thus obtained are identical those of an authentic sample of cephalosporin C.

The disadvantages of the formation of a large amount of penicillin N is explained as follows:

Instead of *Cephalosporium polyaleurum* Y-505, *Cephalosporium acremonium* ATCC 14,553 is used in a similar manner as described in Example 2. A 144 hour incubation gives cephalosporin C and penicillin N in a concentration of 120 μg/ml. and 630 μg/ml., respectively. The thus obtained culture broth is subjected to filtration to separate out the mycelia. The pH of the culture filtrate is adjusted to 3.0 with a 2N hydrochloric acid. The solution is kept standing at 37° C for 2 hours, whereby cephalosporin C is obtained in concentrations of 85 μg/ml. and penicillin N is not detected in the solution. Therefore, about 30% (weight per weight) of cephalosporin C is decomposed by the said treatment.

What we claim is:

1. A method for the production of cephalosporin C which comprises culturing a microorganism belonging to *Cephalosporium polyaleurum* in a culture medium under aerobic conditions, accumulating cephalosporin C in the medium, and recovering the accumulated cephalosporin C therefrom.

2. A method according to claim 1, wherein the cultivation temperature is 15°–37° C and the pH of the culture medium is 3–10.

3. A method according to claim 1, wherein the cultivation temperature is 20°–32° C and the pH of the culture medium is 5–8.

4. A method according to claim 1, wherein the microorganism is *Cephalosporium polyaleurum* 199 (FERM-P No.1159, ATCC-20359).

5. A method according to claim 1, wherein the microorganism is *Cephalosporium polyaleurum* Y-505(FERM-P No.1160, ATCC-20360).

* * * * *